US011198623B2

(12) United States Patent
Pretorius et al.

(10) Patent No.: US 11,198,623 B2
(45) Date of Patent: Dec. 14, 2021

(54) WATER FILTRATION CONTAINER WITH A CENTRALIZED HANDLE AND IN-HANDLE AND IN-RESERVOIR FILTRATION FEATURES

(71) Applicants: Tyron Pretorius, Chicago, IL (US); Valeria Gonzalez, Arlington, VA (US); Alexander Wimber, Arlington, VA (US)

(72) Inventors: Tyron Pretorius, Chicago, IL (US); Valeria Gonzalez, Arlington, VA (US); Alexander Wimber, Arlington, VA (US)

( * ) Notice: Subject to any disclaimer, the term of this patent is extended or adjusted under 35 U.S.C. 154(b) by 0 days.

(21) Appl. No.: 16/452,482

(22) Filed: Jun. 25, 2019

(65) Prior Publication Data

US 2019/0382283 A1 Dec. 19, 2019

Related U.S. Application Data

(60) Provisional application No. 62/662,879, filed on Apr. 26, 2018.

(51) Int. Cl.
*C02F 1/00* (2006.01)
*C02F 1/28* (2006.01)
(Continued)

(52) U.S. Cl.
CPC .............. *C02F 1/003* (2013.01); *C02F 1/283* (2013.01); *B65D 25/2802* (2013.01);
(Continued)

(58) Field of Classification Search
CPC ...... B65D 2525/285; B65D 2525/2885; B65D 2525/2897; B65D 25/2897; B65D 25/30;
(Continued)

(56) References Cited

U.S. PATENT DOCUMENTS 3,070,253 A 1/1961 Brown
4,623,457 A 11/1986 Hankammer
(Continued)

FOREIGN PATENT DOCUMENTS

WO WO-2005/054069 6/2005

OTHER PUBLICATIONS

Pretorius, T.R., Master's Thesis, Notre Dame, Indiana, entitled: "Commercialization of an Ergonomic Platform to Aid Independent Living," dated May 2018, pp. 1-169.

*Primary Examiner* — Benjamin M Kurtz
(74) *Attorney, Agent, or Firm* — Foley & Lardner LLP

(57) ABSTRACT

Disclosed herein is a liquid container having a hollow handle located adjacent to the center of mass of a container filled with liquid. With the hollow handle located adjacent to the center of mass, the total bending moment exerted on a user's wrist is drastically reduced. The container may contain a reservoir tank to retain any type of liquid. Further, the handle is hollow such that liquid may flow from the upper chamber to the lower chamber through the handle. In some embodiments, the handle is structured to house a filtration system. In some embodiments, the reservoir is structured to house a filtration system. A liquid may pass through the filtration system to become treated before being stored in the lower chamber.

10 Claims, 7 Drawing Sheets

(51) Int. Cl.
   *B65D 85/72* (2006.01)
   *B65D 25/28* (2006.01)
(52) U.S. Cl.
   CPC ........ *B65D 85/72* (2013.01); *B65D 2525/285* (2013.01); *C02F 2201/004* (2013.01); *C02F 2307/04* (2013.01)
(58) Field of Classification Search
   CPC ... B65D 25/2811; C02F 1/003; C02F 2307/04
   USPC .......................... 220/770, 771, 761, 775, 776
   See application file for complete search history.

(56) References Cited

U.S. PATENT DOCUMENTS

| | | |
|---|---|---|
| 4,658,975 A | 4/1987 | Cone |
| 4,834,269 A * | 5/1989 | Cone ........................ B65D 1/12 |
| | | 220/771 |
| 4,999,109 A | 3/1991 | Sabre |
| 5,225,078 A | 7/1993 | Polasky et al. |
| 5,447,259 A | 9/1995 | Erickson |
| 5,657,898 A | 8/1997 | Portman et al. |
| 5,830,360 A | 11/1998 | Mozayeni |
| 6,016,977 A | 1/2000 | Farley |
| 6,076,450 A | 6/2000 | DiGiorgio, Jr. |
| 6,227,382 B1 * | 5/2001 | Cutler ................... A47J 31/605 |
| | | 210/473 |
| 6,237,792 B1 | 5/2001 | Skolnicki et al. |
| 6,312,364 B1 | 11/2001 | Selsam |
| 6,460,715 B1 | 10/2002 | Yonemori et al. |
| 6,537,455 B2 | 3/2003 | Farley |
| 2006/0163174 A1 | 7/2006 | Namespetra et al. |
| 2010/0230427 A1 * | 9/2010 | Parker ................... B65F 1/1468 |
| | | 220/756 |
| 2011/0056386 A1 | 3/2011 | Taketani |

\* cited by examiner

WATER FILTRATION CONTAINER WITH A CENTRALIZED HANDLE AND IN-HANDLE AND IN-RESERVOIR FILTRATION FEATURES

CROSS-REFERENCE TO RELATED PATENT APPLICATIONS

This application claims the benefit of priority from U.S. Provisional Application Ser. No. 62/662,879, filed on Apr. 26, 2018, the contents of which are incorporated herein by reference in their entirety.

BACKGROUND

The present invention relates generally to the field of containers. More specifically, the present invention relates to a container for holding liquids. Generally, most containers consist of a body that holds the liquids and a handle attached at the end of the body to carry the container. By having a handle attached to the end of the body, a bending moment is created due to the weight of the liquid in the container and that bending moment is then exerted on the user as the user is carrying the container or dispensing a liquid from the container. The exertion of the bending moment can cause unnecessary spills and can make carrying the container difficult for users.

SUMMARY

One or more embodiments relate to a container comprising an upper chamber and a lower chamber wherein the chambers are coupled via a hollow channel and connected via at least one peripheral wall. The container comprises a void which is defined by at least one of the peripheral walls and is located within an aperture that is located on the peripheral wall. The container further comprises a handle that is connected to a lower portion of the upper chamber and to an upper portion of the lower chamber and lies within the void. The handle is configured such that it is adjacent to the center of mass of the container and/or runs through the center of mass. In some embodiments, the handle is hollow such that it fluidly connects the upper and lower chambers. More specifically, liquid introduced to the upper chamber may flow to the lower chamber through the handle.

In some embodiments, the upper chamber of the container further comprises a reservoir tank that is used to store excess liquid before it flows into the lower chamber. In one embodiment, the reservoir tank is structured such that it includes an elongated housing that removably fits into the handle. The elongated housing is a cylinder and has a length which is shorter than the length of the handle.

In some embodiments, the handle includes a liquid treatment filtration system. The liquid treatment filtration system is positioned within the handle and is structured so that it could release water into the lower chamber. Further, the liquid treatment filtration system is structured to receive untreated liquid from a source that is external to the handle and treat the liquid. The treated liquid is then released into the lower chamber via an opening in the handle. In some embodiments, the liquid treatment filtration system comprises activated carbon.

In some embodiments, the liquid treatment filtration system may reside in the upper chamber or the reservoir. In particular, the liquid treatment filtration system may reside at the bottom of the upper chamber or reservoir. When the liquid filtration system resides in the upper chamber or reservoir, it is structured such that it receives untreated liquid from an external source, treats the liquid and releases the treated liquid into at least one handle which then releases the treated liquid into the lower chamber.

In some embodiments, the handle comprises a handle assembly. In some embodiments, the handle assembly is removable. In some embodiments, the assembly comprises an upper plate, a lower plate and the handle (i.e. a housing defining the handle). The handle is coupled to either end of the upper and lower plates. Further, the upper plate is coupled to the lower surface of the upper chamber and the lower plate is coupled to the upper surface of the lower chamber. The handle is positioned adjacent to the center of the mass or run through the center of mass. The upper plate and the lower plate may comprise a first hole and a second hole respectively and the handle may be hollow such that liquid may flow through the handle from the upper chamber to the lower chamber. In some embodiments, the handle is configured to house a liquid treatment filtration system.

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying diagrams.

Figure 1A:
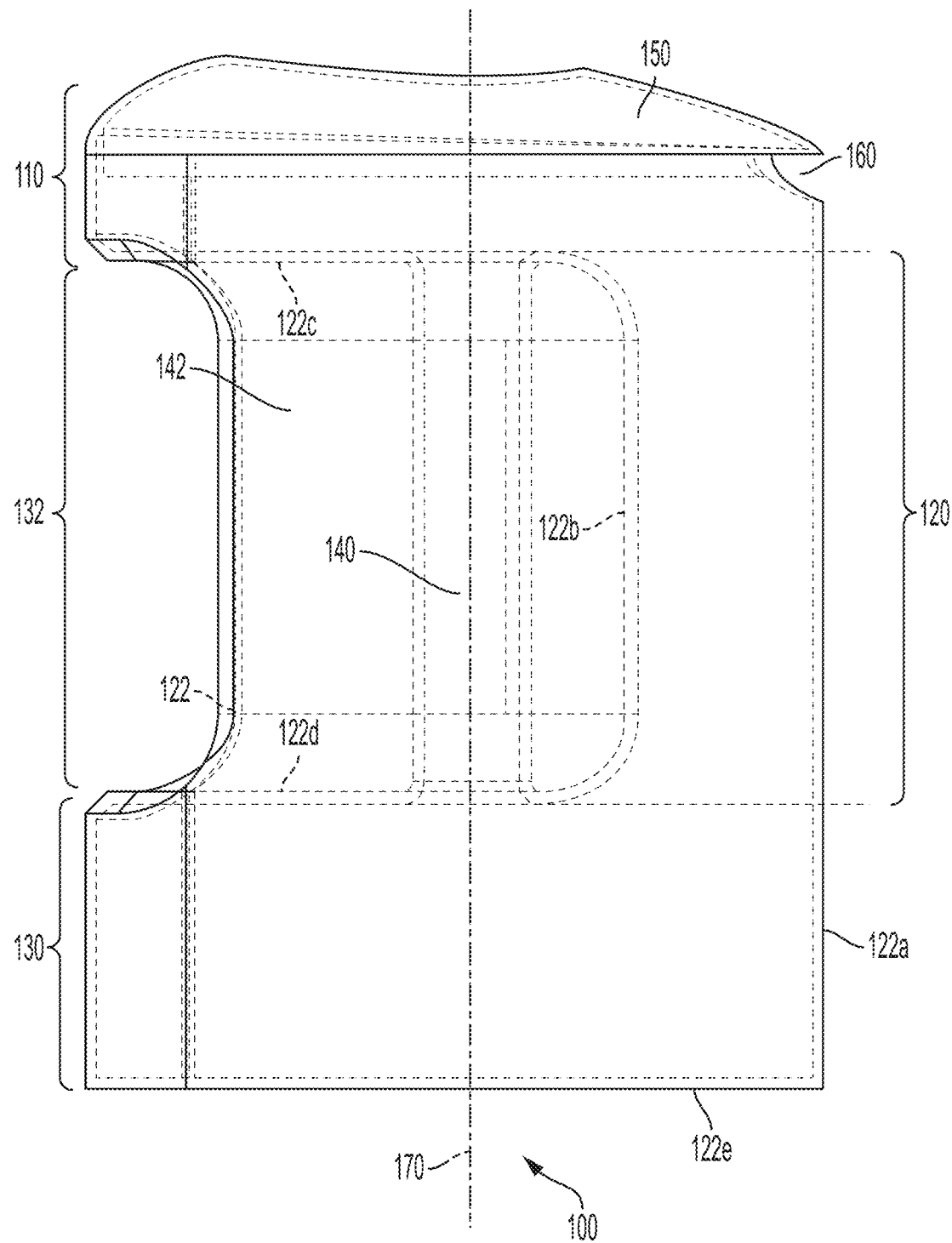
FIG. 1A illustrates a cross-sectional view of a container with a centralized handle, according to an example embodiment.

Reference is made to the accompanying drawings throughout the following detailed description. In the drawings, similar symbols typically identify similar components, unless context dictates otherwise. The illustrative implementations described in the detailed description, drawing, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Referring to the Figures generally, a water filtration container with a centralized handle is disclosed. Aspects of the embodiments disclosed herein reduce the bending moment that a user would experience when using the container. In particular, the user would experience a reduction of a bending moment on the user's wrist. Because the handle is aligned with the vertical axis of the entire container and is positioned adjacent to the center of mass of the container, the bending moment experienced by a user is significantly reduced, such that it approaches zero. These features allow users to carry the container with one hand, reduce the number of spills, and reduce the number of times a container is dropped. Further, the features disclosed herein make carrying a container for all types of users such as kids or the elderly easier.

According to some embodiments, the container further includes a filter for filtering particulate matter out of liquids. According to various embodiments, the filter may be positioned above the handle in the upper chamber or the reservoir tank or it may sit inside the handle. The filter comprises materials such as activated carbon and/or flavor enhancers that the liquid poured in by a user will flow through.

Figure 1B:
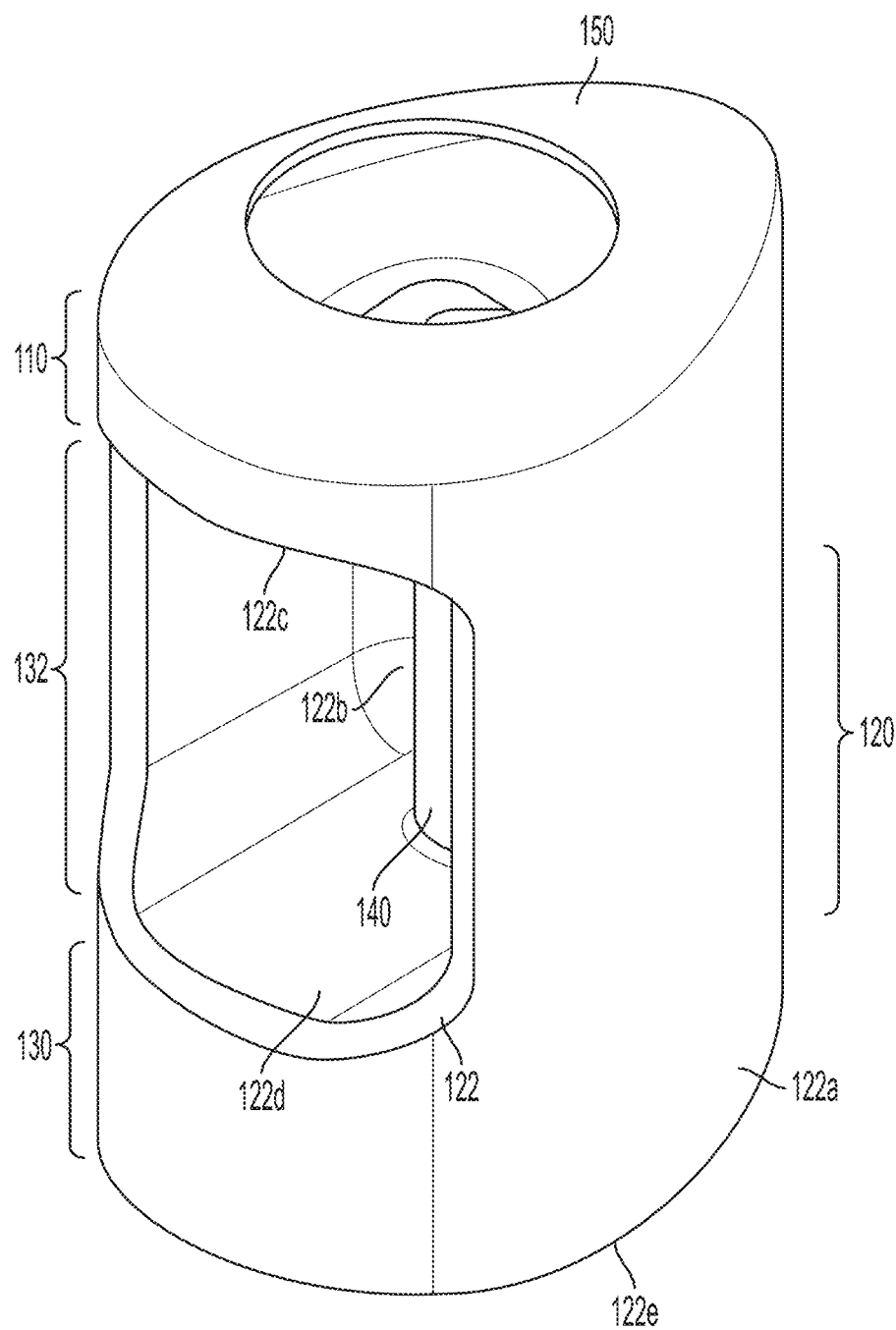
FIG. 1B illustrates an isometric view of a container with a centralized handle, according to an example embodiment.

FIG. 1A is a cross-sectional view of one embodiment of a container 100 with a centralized handle, according to an example embodiment and FIG. 1B is an isometric view of one embodiment of a container 100 with a centralized handle. Referring to FIGS. 1A and 1B, the container 100 of the example embodiment is structured to allow for and provide the benefit of carrying containers filled with liquid without exerting a great deal of bending moment on a user's wrist. The container 100 includes an upper chamber 110, a channel 120, one or more peripheral walls 122, a lower chamber 130, a handle 140, a void 142 defined by portions of the peripheral wall 122, a lid 150, and, in the illustrated embodiment, a spout 160.

The container 100 may be formed by arrangement of the peripheral wall 122. The container may have a generally cylindrical form, as illustrated, or may have a polyhedral shape, with the aperture 132 as described below. In an example embodiment, the arc angle of the peripheral wall 122 is between 220 and 300 degrees. The peripheral wall 122, which may be formed of separate pieces or a unitary component, comprises an outer wall 122a, an inner wall 122b, an inner wall top portion 122c, and inner wall bottom portion 122d, and a peripheral wall bottom portion 122e. The upper chamber 110 is defined by the outer wall 122a, the inner wall top portion 122c, and the lid 150. The lower chamber 130 is defined by the outer wall 122a, the inner wall bottom portion 122d, and the peripheral wall bottom portion 122e. The channel 120 is defined by the space between the upper chamber 110, the lower chamber 130, the outer wall 122a, and the inner wall 122b. In some embodiments, the peripheral wall bottom portion 122e is removable from the remainder of the container 100, such as by being clasped on, threadably (and water-tightly) engagable, or attached through a similar method (e.g., an interference fit), providing easy of access into the container 100 such as for cleaning. Additionally, the container 100 has a height ranging from 20 cm to 35 cm.

In the one embodiment, the upper chamber 110, the channel 120, and the lower chamber 130 are created and connected through a molding process, as described further below. Alternatively, the components may be separate structures secured together such as by a bonding process. The upper chamber 110 is structured to retain the liquid that is first introduced into the container 100. In some embodiments, the upper chamber 110 is structured to house a reservoir tank and a filtration system. The lower chamber 130 is structured to hold the liquid that has flowed from the upper chamber 110 through the handle 140 and into the lower chamber 130. In some embodiments, the lower chamber 130 is structured to hold the liquid that has flowed from the upper chamber 110 through the channel 120 and/or the handle 140. In some embodiments the lower chamber 130 comprises treated liquid that has flowed through a filtration system. The upper chamber 110 is separated from the lower chamber 110 by the channel 120, the peripheral wall 122 and the handle 140.

The channel 120 is structured to hold excess liquid when the lower chamber 130 is at capacity and to allow a user to pour liquid from the lower chamber 130 to a destination via the spout 160. The channel 120 has a width that ranges from 5 cm to 15 cm.

The peripheral wall 122 partially surrounds the handle 140, providing the void 142, and an opening through which a user can access the handle 140. More specifically, the inner wall 122b, the inner wall top portion 122c and the inner wall bottom portion 122d surround the handle 140. The distance between the inner wall 122b and the center of the handle 140 ranges from 1 inch-3 inches. Thus, the handle 140 is disposed within the void 142. As shown, the handle 140 is a cylindrical rod that is connected to the center of the bottom surface of the upper chamber 110 and the center of the upper surface of the lower chamber 130. By connecting, on either end, to the center points or areas of the respective surfaces, the handle 140 is positioned to run through or adjacent to the center of mass of the container 100, which lies on the vertical axis 170 of the container 100. The handle 140 may be solid and may have a form factor other than a cylinder, such as to accommodate a user's grip.

Figure 2:
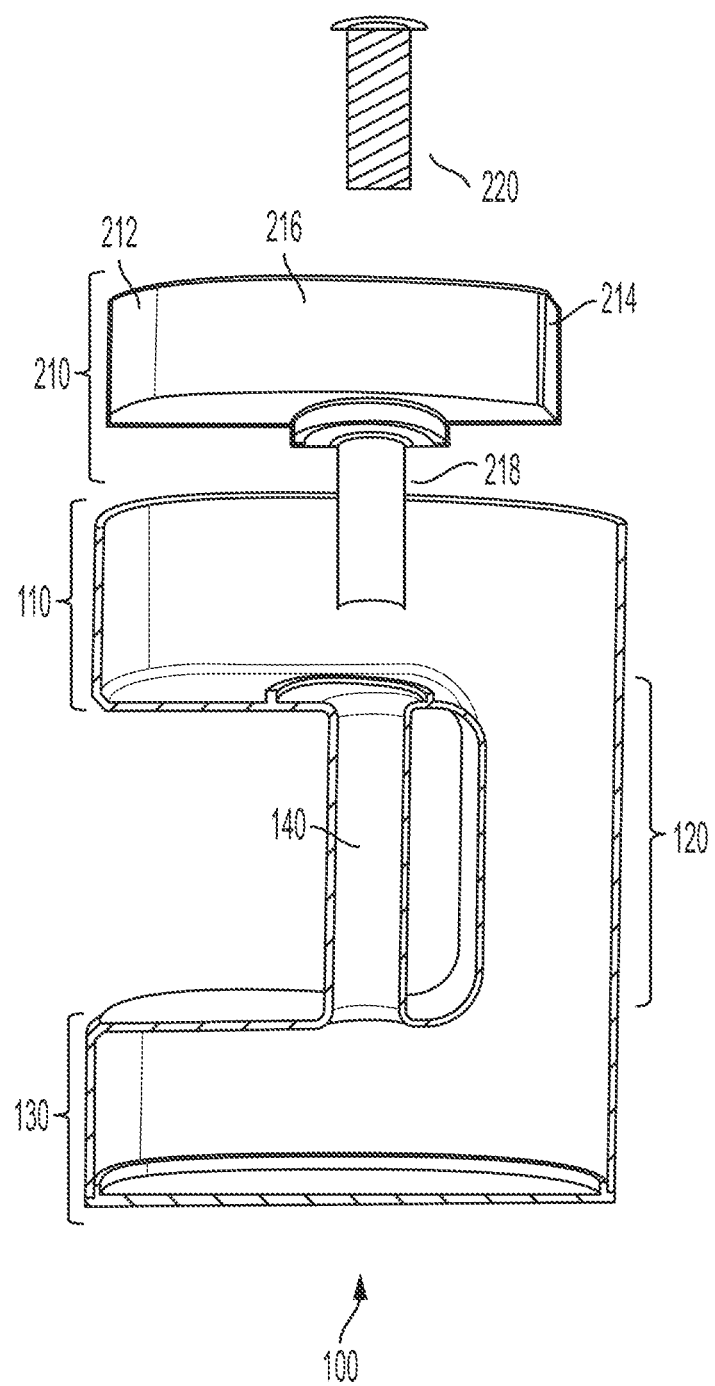
FIG. 2 schematically illustrates a cross-sectional view of a container with a centralized handle of FIG. 1A, further comprising filtration features, according to an example embodiment.

As shown in FIG. 2, the handle 140 is hollow such that an access point between the upper chamber 110 and the lower chamber 130 is created for fluidly coupling the two chambers. As shown, the void 142 around the handle 140 is created by the peripheral wall 122 such that a user may grasp the handle 140 with the user's hands.

In the embodiment of FIG. 1A, the container 100 comprises an aperture 132 on one side that gives access to the void 142. Further, the inner wall 122b is located at a distance away (e.g., between 5 cm and 20 cm) from the aperture 132 such that a user may place the user's hand inside the aperture 132. In the example embodiment, the width of the aperture 132 is sufficient for a user to comfortably place the user's hand around the handle 140.

In one example embodiment, the void 142 is closer to the upper chamber 110 than to the lower chamber 130 such that the volume of the liquid that may be stored is maximized. More specifically, the void 142 begins where the upper chamber 110 ends (such that the void 142 is defined in part by the bottom surface of the upper chamber 110) and the void 142 ends where the lower chamber 130 begins (such that the void 142 is defined in part by the top surface of the lower chamber 130). Further, the void 142 has a height ranging between 10 cm to 20 cm, according to various embodiments.

Both the upper chamber 110 and the lower chamber 130 have a height. The height of the lower chamber 130 is greater than the height of the upper chamber 110, for example, in a 3:1, 3:2, 5:4, 10:9 ratio or similar. In one example embodiment, the height of the lower chamber 130 is the same height as the upper chamber 110 such that the ratio is 1:1. In one example embodiment, the upper chamber has a height of 2.8 cm and the lower chamber has a height of 7.6 cm. This allows more liquid to be stored in the lower chamber 130 than the upper chamber 110. In some embodiments, the void 142 is placed in the middle of the container 100 such that the height of the lower chamber 130 is the same as the height of the upper chamber 110. In the embodiment of FIG. 1A, the lid 150 is connected to the upper chamber using an interference fit. In the example embodiment, the spout 160 is part of the upper chamber 110.

The handle 140 may further be covered with a material comprising neoprene, thermoplastic, rubber, silicon, thermoplastic vulcanizate or any similar material in order to improve grip. In some embodiments, the material is removably wrapped around at least a portion of surface area of the handle 140. In other embodiments, the material is applied as an adhesive, non-removable coating deposited onto at least a portion of the surface area of the handle 140.

In operation, a user pours a liquid into the lid 150. The user is conceptualized to be a consumer, and the liquid can include any liquid suitable for filtration and/or consumption, such as water, vitamin-enhanced liquid, flavor-enhanced liquid, juice, coffee, etc. Accordingly, the container 100, in the example embodiment, is a household item, such as a pitcher. The lid 150 comprises a cap and a hole (as further described relative to FIG. 5) that allows the liquid to flow into the upper chamber 110. In some embodiments, the lid 150 comprises a hollow opening, which further comprises or houses a filter (not shown) such that liquid first flows through the hollow opening and via the filter before reaching the upper chamber 110.

In operation of the container 100, the liquid will flow from the upper chamber 110 through the handle 140 to the lower chamber 130. If the rate at which the liquid is being poured into the upper chamber 110 is higher than the rate at which the liquid is flowing from the upper chamber 110 to the lower chamber 130 through the handle 140, then the upper chamber 110 will act as a reservoir. Further, when the lower chamber 130 reaches maximum capacity with liquid, any additional liquid will then begin to fill up the channel 120. Advantageously, these features reduce liquid spillage and allow the user to fill the container 100 without waiting for the in-handle and/or in-reservoir filtration process to complete. In some embodiments, to allow time for filtering and prevent the mixing of treated and untreated liquids, in the case a reservoir can be used to direct the flow of liquid through the handle such that untreated liquid does not mix with the treated liquid. In some embodiments, the reservoir comprises a funnel and/or is replaced by a funnel.

When a user is using the container 100, the user will place the user's hand within the void 142 and around the handle 140. The user will then tip the container 100 and will pour the liquid out of the spout 160 into the desired destination (i.e. a cup, a plant pot, a sink etc.). More specifically, the liquid that is stored in the lower chamber 130 and the channel 120 will flow through the channel 120 and out of the spout 160.

In some embodiments, the handle 140 is angled, curved, or straight.

In some embodiments, the handle 140 extrudes into the upper chamber 110 and has a conical shape such that a user can pour liquid directly into the handle 140. More specifically, the conical shape prevents the liquid being poured into the handle from flowing to the lower chamber 130 via the channel 120.

In some embodiments, the lid 150 is secured above the upper chamber 110 using latches, pins, or another method as to secure it from falling when a user is dispensing liquid from the container 100.

In some embodiments, the handle 140 is connected to the center of the bottom surface of the upper chamber 110 and the center of the upper surface of the lower chamber 130 using latches, fasteners, clips, brackets, or any other method of joining two or more objects together. With respect to methods of manufacture of the container 100 of FIG. 1, the molding process in the present embodiment is injection molding. In an example implementation, the molding process is used to create the upper chamber 110, the lower chamber 130, the channel 120 and peripheral walls 122, the handle 140, the lid 150, and the spout 160. To make each part, pellets of material are loaded into a hopper. In the present embodiment the pellets of material is Tritan plastic. Then, a reciprocating screw rotates such that the pellets of material flow into one end of the screw chamber. The screw chamber is a hollow cylindrical rod comprising of a tapering reciprocating screw. Further, the reciprocating screw rotates such that the pellets of materials flow from one end of the chamber to the other end of the chamber. While the pellets of material flow from one end of the chamber to the other end of the chamber, for example from the right side of the chamber to the left side of the chamber or vice-versa, the pellets of material are heated through the combination of heater bands and friction. More specifically, because the reciprocating screw tapers, the diameter of the screw increases which decreases the space between the reciprocating screw and the chamber wall. This causes the pellets of material to shear as they contact the chamber wall. Due to the contact, friction begins to heat up the pellets of material. In conjunction, the outer portion of the chamber is lined with heater bands that supplement additional heat. With the combination of friction and the heater bands, the pellets of material are converted to molten material. For the material to reach the molten state, the temperature of the pellets of material may reach between 300° F. and 600° F., inclusive. Then, the molten material flows through the flutes at the end of the reciprocating screw and into the mold of the part that is being made. The mold is allowed to cool such that the desired part and the mold can be separated.

The above process is repeated to create the various parts needed for the container 100, such as the parts described relative to FIG. 1. Finally, the various parts are connected together to make the container 100. More specifically, in one example embodiment, the various parts are bonded. In the present embodiment, the various parts may be bonded by fusion bonding, such that the various parts that need to be connected are held against a heating platen. The heating platen heats the various parts such that the plastic begins to melt on each of the respective parts. The various parts are then forced together and allowed to cool such that they are joined.

In some embodiments, the material loaded in to the hopper is styrene-acrylonitrile resin, styrene-acrylic copolymer, polystyrene, thermoplastic elastomer, acrylonitrile butadiene styrene, polylactic acid or thermoplastic vulcanizate.

In some embodiments, the various parts are held together with screws, fasteners, hinges, latches or any similar method of joining two or more objects together.

In some embodiments, the molding process is a vacuum molding process. More specifically, a mold of a desired part is created. A material is then heated to a forming temperature, which has a range of 100° F.-600° F. The temperature will vary depending on the type of material being used, the thickness of the material and the density of the material. Once the material is heated, it is laid over the mold of the specific part and pushed down. While the material is being pushed over the mold, a vacuum will pull the air out between the heated material and the mold. Lastly, the material is allowed to cool and then the mold is removed such that the desired part is created. Once the mold is removed, the desired part is then processed to remove any spare plastic. The process is then repeated to create any other desired part. The multiple parts are then connected together using the various processes as described above.

In some embodiments, the molding process is a rotomolding process. More specifically, a mold of the desired part is created and placed in a rotomolding machine. The rotomolding machine will rotate the mold around both the x-axis and the y-axis of the mold simultaneously. Further, a material is heated to a range between has a range of 100° F.-600° F., the exact temperature is dependent on the type of material. The heated material is then injected in the mold as the mold rotates such that even layers form on the inner sides of the mold. The mold is allowed to cool and then the created part is removed from the mold. This process is repeated for any additional parts that need to be made. The multiple parts are then connected together using the various processes as described above.

In some embodiments, the molding process is 3D printing. More specifically, a machine will 3D print the desired part based on a definition (e.g., a drawing, a digital model, etc.) of the part that is referenced by the machine. The process is repeated for each part. The multiple parts are then connected together using the various processes as described above.

Referring now to FIG. 2, a cross-sectional view is shown of a container 100 with a centralized handle of FIG. 1A, further comprising filtration features, according to an example embodiment. The features of the example embodiment allow for and provide the benefit of filtering a liquid while reducing the stress exerted on a user by placing the filtration features in line with the vertical axis. The container 100 includes the upper chamber 110, the channel 120, the lower chamber 130, the handle 140, the reservoir tank 210, and the filter 220.

The upper chamber 110, the channel 120, the lower chamber 130, and the handle 140 are coupled (e.g., fluidly coupled) during the molding process (as described in FIG. 1). The reservoir tank 210 is created during the molding process, in the same manner as described above in FIG. 1. The reservoir tank contains a rounded back wall 212, a flat front face 214, a reservoir peripheral wall 216, and base 218. The reservoir tank 210 sits inside the upper chamber 110 and is secured via an interference fit. More specifically, the base 218 sits at the bottom of the upper chamber 110, the reservoir peripheral wall 216 and the rounded back wall 212 are very close to the side and back walls of the upper chamber 110 such that the distance between them is negligible (i.e. a distance ranging between 0 meters and 0.005 meters). Because the distance is negligible, the reservoir peripheral wall 216 and the rounded back wall 212 make slight contact with the walls of the upper chamber. This creates friction between the walls of the upper chamber and the walls of the reservoir tank 210, which then hold the reservoir tank 210 in place.

The flat front face 214 does not cover the hollow channel 120 so that any liquid in the lower chamber 130 may be dispensed through the spout 160. Further, the flat front face 214 prevents the liquid stored in the reservoir tank 210 from mixing with the liquid that is being dispensed. The reservoir tank 210 is removable.

The filter 220 is a cylindrical housing unit comprising one or more filtration layers, such as activated carbon, ion exchange resin, etc. In some embodiments, the filter 220 is structured to hold various fresh fruits, flavor enhancers, or another liquid treatment option within the cylindrical housing. The composition of material within the cylindrical housing of the filter 220 is hereinafter referred to as filtration media. In some embodiments, the reservoir tank 210 may hold more than one filter 220. In the present embodiment, the cylindrical shape of the filter 220 creates an interference fit with the base 218. In some embodiments, the filter 220 may be placed in an external housing unit that is separate from the cylindrical housing unit comprising filtration media. In some embodiments, the external housing unit comprising filtration media is smaller than the external housing unit such that the ratio of the dimensions are 5:6, 3:4 or a similar ratio. In some embodiments the reservoir 210 and the housing for the filter 220 are combined.

In some embodiments, the filter 220 is placed into the handle 140. The filter 220 can be secured in the handle 140 using a twist and lock method, an interference fit, a pop fit, or a similar method of securing the filter 220 in the handle 140. More specifically, the filter 220 sits within the handle and below the reservoir tank 210.

In operation, as a user introduces an untreated liquid into the container 100, the reservoir tank 210 receives the untreated liquid (any liquid that may include particulate matter, contaminants, etc.). The filter 220 is structured to filter the untreated liquid and allow a treated liquid to flow through the handle 140 to the lower chamber 130. More specifically, when an untreated liquid is introduced to the reservoir tank 210, the filter 220 will begin to take some of the untreated liquid and pass it through the filtration media. The filtration media will dispel any contaminants present in the liquid and/or will add flavoring to the liquid or go through a variation as such. Once the untreated liquid passes through the filtration media, the untreated liquid will become treated liquid and it will flow through the handle 140 and into the lower chamber 130. The reservoir tank 210 begins to retain untreated liquid and store it before it can pass through the filtration media when the rate at which untreated liquid is introduced to the reservoir tank 210 is greater than the rate at which the filter 220 is able to pass the untreated liquid through the filtration media. For example, if a user introduces an untreated liquid at a flow rate of 5.7 liters per minute, but the filter 220 is only able to treat 0.25 liters per minute of the liquid, then the remaining liquid will be stored in the reservoir until it can be filtered.

In some embodiments, the reservoir tank 210 has a base 218. In some embodiments, the base 218 is flat or substantially flat. In some embodiments, the base 218 comprises an elongated housing that may fit directly inside the handle 140. More specifically, the elongated housing can act as a housing unit for the filtration media of the filter 220. In this embodiment, a user would place the filtration media of the filter 220 within the elongated housing of the filter 220. At the bottom of the elongated housing, a stop surface is included to prevent the filter 220 from entering the lower chamber. In one embodiment, the stop surface is a circular or substantially circular lip that has a circumference smaller than the circumference of the bottom of the filter 220 such that a portion of the filter sits on top of the lip. In one embodiment, the stop surface is defined by two pieces of plastic positioned to create a cross that the filter 220 may sit on. Further, in some embodiments, the filter 220 can be structured to protrude into the reservoir tank 210 for easy removal.

In some embodiments, the housing of the filter 220 is a cone, a truncated cone, a cube, a rectangle, a substantially flat structure, etc. In some embodiments, the housing and the filter media are combined, such as in a paper-based filter 120, which may not have a separate housing.

Figure 3:
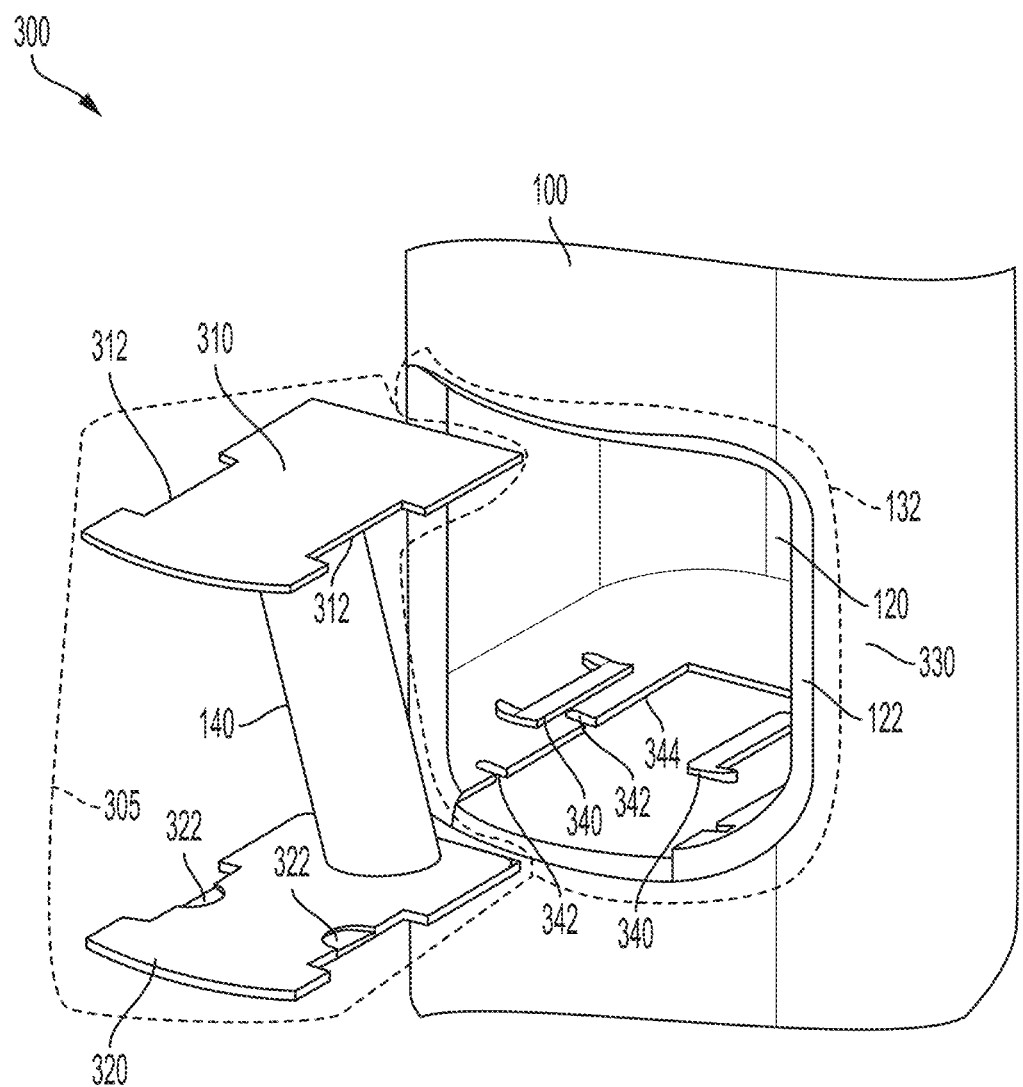
FIG. 3 schematically illustrates aspects of a handle connecting assembly of the container with a centralized handle of FIG. 1A, according to an example embodiment.

FIG. 3 refers to aspects of a handle connecting assembly 300 of the container with a centralized handle of FIG. 1, according to an example embodiment. As shown, the handle connecting assembly comprises a removable handle assembly 305 and the container connection section 330. In one embodiment, the handle 140 may be removable such that different ergonomic handles may be installed. The removable handle assembly 305 is structured to make the container 100 ergonomic, allow for easier cleaning of the container 100 or allow for a user to remove the filter 220 from inside of the handle 140. The removable handle assembly 305 comprises a top plate 310, the handle 140, and a bottom plate 320. The top plate 310 further comprises indented cuts 312 on each side. The bottom plate comprises notches 322. The container connection section 330 is an aperture 132 in the container 100, which comprises a restraint 340, locking indents 342, and a lip 344. The container connection section 330 is created within the inner portion of the plurality of peripheral wall 122 and the inner portion of the channel 120.

The top plate 310 and the bottom plate 320 are connected to the handle 140 either by the molding process (described above with respect to FIG. 1) or by using fasteners, screws, latches or any other method of joining two or more objects together. Further, the removable handle assembly 305 is then placed into the container connection section 330. The bottom plate 320 rests at the bottom of the container connection section 330 under a lip 344. The plurality of restraint 340 is placed over the bottom plate such that an extruded part fits in the notches 322. The plurality of restraint 340 is pushed into the locking indents 342 such that an interference fit with the locking indents 342 is created to secure the removable handle assembly 305 in the container collection section 330. Further, the top plate 310 rests flush with the top of the container connection section 330 under a similar lip 344. A restraint 340 is used to secure the top plate 310 in a similar manner as used to secure the bottom plate 320.

In operation, a user would select the user's desired removable handle assembly 305. In the present embodiment, the removable handle assembly 305 has the handle 140 as cylindrical straight rod. The user would then slide in the removable handle assembly 305 in the container connection section 330. Once the removable assembly 305 is properly secured under the lip 344 for both the top plate 310 and the bottom plate 320, the user will insert the restraint 340 on both sides of the bottom plate 320 and top plate 310 such that they slide into the locking indents 342.

In some embodiments, the top plate 310 does not have a restraint 340 that secures it to the upper portion of the container connection section 330.

In some embodiments, the removable handle 305 assembly comprises the handle 140, which may be curved, slanted, or offset.

In some embodiments, the top plate 310, the bottom plate 320, and the upper and bottom portion of the container connection section have a bored circle such that the upper chamber 110 is connected to the lower chamber 130 via a handle 140 that is hollow as described in FIG. 1.

In some embodiments, the restraint 340 is attached to the inner portion of the peripheral wall 122 via a connection method such as hinges, such that a user would only need to press the restraint 340 down in to the locking indents 342 rather than needing to manually line them up and then push them down.

Figure 4:
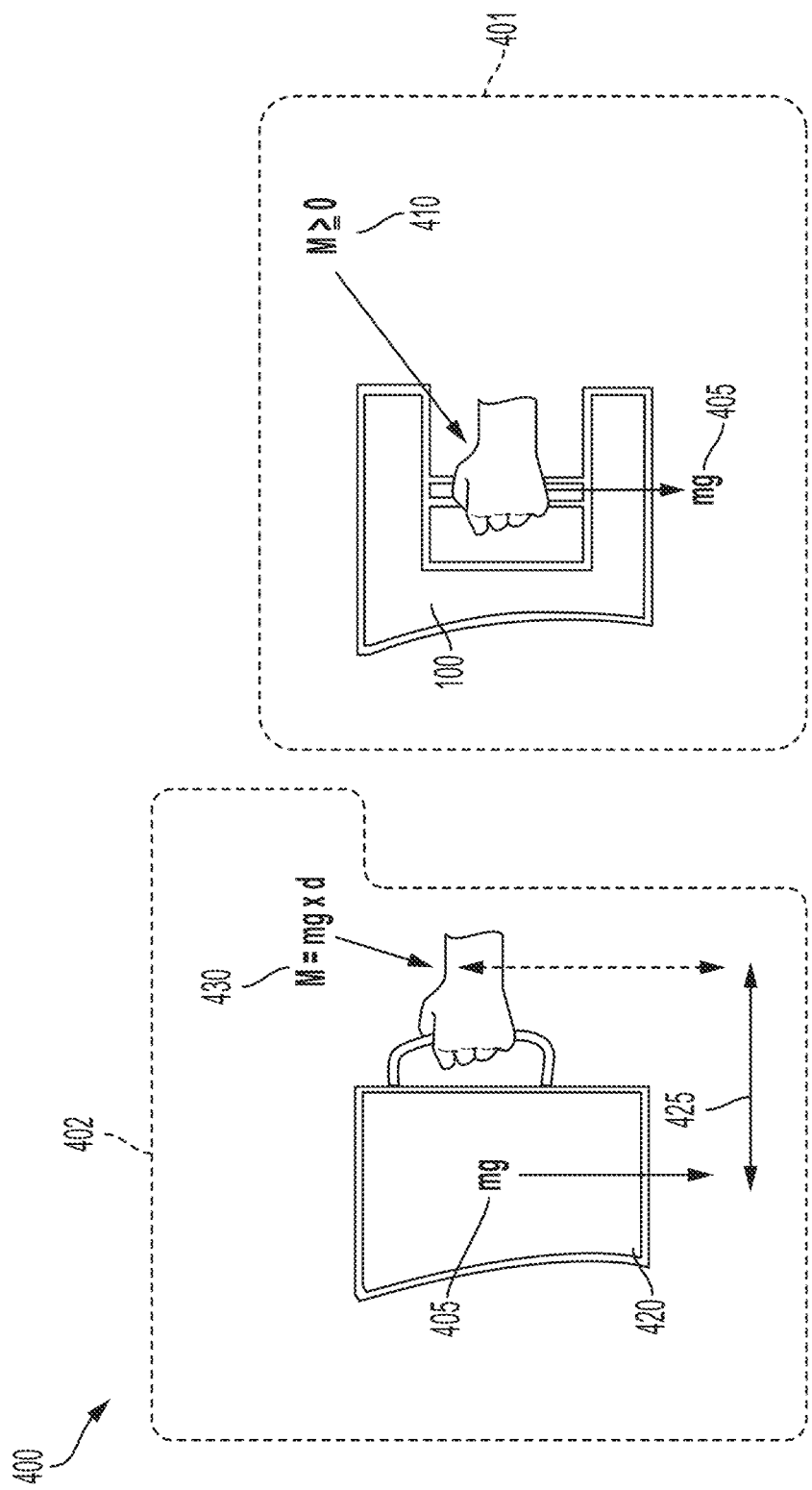
FIG. 4 schematically illustrates the bending moment that occurs on a user in operation of the container with a centralized handle of FIG. 1A, according to an example embodiment.

FIG. 4 refers to an illustration of the bending moment 400 that occurs on a user, according to an example embodiment. More specifically, the diagram 400 comprises a free-body diagram 401 for the container 100 of FIG. 1A of the present disclosure (or a similar implementation) and a conventional container free-body diagram 402. In particular, the free-body diagram 401 for the container 100 illustrates the bending moment that occurs when a user is using the container 100. Further, the conventional container free body diagram 402 illustrates the bending moment that occurs when a user is using a conventional container 420 in which a handle may be located on the outer surface of the conventional container 420 and/or may not be aligned with the center of mass of the conventional container 420.

FIG. 4 illustrates some of the advantages that the container 100 of FIG. 1A has over a conventional container 420.

The conventional container free-body diagram 402 shows the force 405 being exerted on the conventional container 420. The force 405 is the mass value in kilograms times the gravitational acceleration (mg). The conventional container free-body diagram depicts the force 405 occurring at the center of mass of the conventional container 420. In this embodiment the mass value is the mass of the conventional container 420 and the gravitational acceleration is a numerical value of 9.81 m/s^2. Further, a user will hold the handle at some distance (d) 425 away from the force 405. The distance is determined by the dimensions of the conventional container 420. Using the equation 430, M=mg*d, the bending moment that is exerted on a user can be calculated. The bending moment that would be exerted on the user would be in the counter clockwise direction, which when a user is holding the conventional container 420, would torque the user's hand away from the user's body and towards the surface. This would cause spills of any liquid or dropping of the conventional container 420. Additionally, for a user to counteract the bending moment being exerted due to the placement of the handle on the conventional container 420, a user may have to use two hands such that one hand is holding the handle of the conventional container 420 and the other hand is supporting the base of the conventional container 420.

The free-body diagram 401 shows the force 405 being exerted on the container 100. In this embodiment, the force 405 is the mass value in kilograms times the gravitational acceleration which is a numerical value of 9.81 m/s^2. The mass value is the mass of the container 100. In some embodiments, the mass value will be the mass of the container 100 and the filter 220 as described in FIG. 2. On the container 100, the force 405 is exerted at the center of mass of the container 100. In this embodiment, the distance value is negligible because of where the user would be grasping the handle. As shown in 401, the user is grasping the handle at the location of the center of mass. In some embodiments, the user would be grasping the handle very close to the location of the center of mass but not directly at the location. This will vary (the mass distribution around the center of gravity will change) based on handle design. Other factors affecting the mass distribution around the center of gravity may include: whether the channel and/or the lower chamber contains liquid, whether a reservoir and/or a filter housing are being used, etc. Therefore, in an example embodiment, the handle of the container of the present disclosure is aligned with the center of mass of the container indicative of a state when the container is at rest and/or is empty. Using the equation 430 M=mg*d, the bending moment exerted on the user would be M≈0 410. This is because the value for d 425 is negligible and can be assumed to be zero.

In some embodiments, the gravitation acceleration value is 32 ft/s^2, the mass value is in the unit pounds (lb.), and the distance value is in the unit feet.

In some embodiments, the mass value of the container 100 includes the mass value of some amount of liquid that exists in the container 100.

Figure 5:
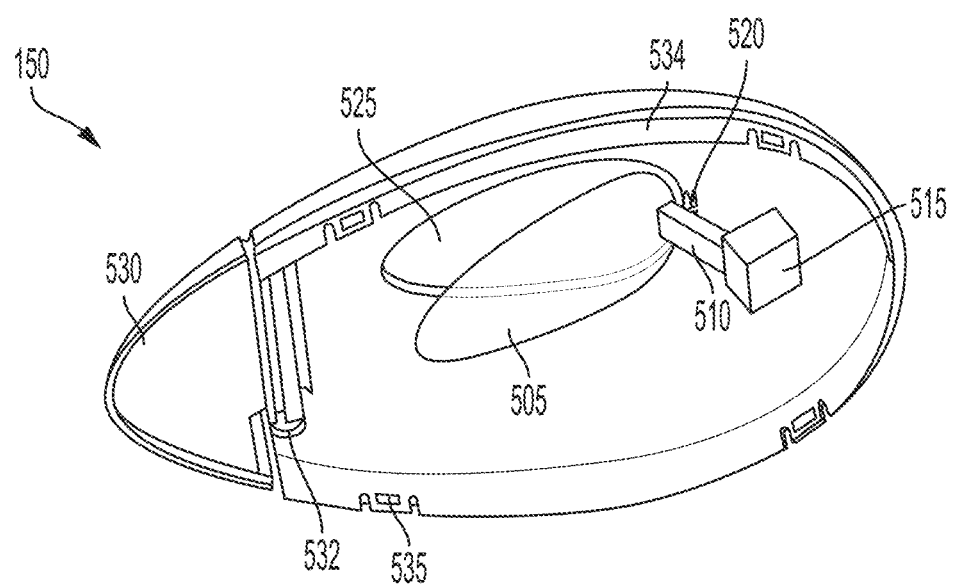
FIG. 5 schematically illustrates a lid to the container with a centralized handle of FIG. 1A, according to an example embodiment.

FIG. 5 refers to a lid 150 to the container with a centralized handle of FIG. 1, according to an example embodiment. The lid 150 includes a cap 505, a rod 510, has a mass 515, a plurality of brackets 520, a hole 525, a spout lid 530, a spout lid hinge 532 and a lip 534. In some embodiments, the lid 150 includes a plurality of lid connectors 535. In embodiments where the plurality of lid connectors 535 are not included, the lid 150 is secured through an interference fit. The lid 150 of the example embodiment is structured to allow for and provide the benefit of covering the container 100 so that no airborne contaminants fall in to the container when the container 100 is at rest. In one example of the embodiment, the lid has a length ranging from 15 cm to 25 cm.

The cap 505 is connected to one end of the rod 510 during the molding process as describe in FIG. 1. The mass 515 is connected to the other end of the rod 510 during the molding process described in FIG. 1. The mass 515 is a weighted piece of material that ranges from 25 grams to 100 grams. The material used to create the mass 515 can be metal, styrene-acrylonitrile resin, styrene-acrylic copolymer, polystyrene, thermoplastic elastomer, acrylonitrile butadiene styrene, polylactic acid or any similar material. In the present embodiment, the rod 510 is connected to the bottom surface of the lid 150 using the plurality of brackets 520. This connection creates a pivot. More specifically, the rod 510 is slanted such that the mass 525 is located at some point under the cap 525. Further, the spout lid 530 is fabricated as part of the lid during the molding process and includes a spout lid hinge 532. The lid 150 includes a lip 534, which is created during the molding process.

In operation, the lid 150 would fit over the upper chamber 110 of the container 100 as described in FIG. 1. The lid 150 would be fitted with an interference fit where the lip 534 has a circumference, which is slightly smaller than the circumference of the upper chamber 110 of FIG. 1. When the lid 150 is placed on top of the upper chamber 110, the lip 534 makes slight contact with the inner wall of the upper chamber 110. The friction created by the contact secures the lid 150 in place.

In further operation, the mass 510 keeps the rod 110 in an upright position such that the cap 505 covers the hole 525 when the container 100 is not being filled with liquid. This occurs because the mass 515 creates a counter clockwise bending moment that is greater than the clockwise bending moment that is created by the weight of the cap 505. In some embodiments, the directions of the bending moment may be vice-versa such that the mass 515 creates a clockwise bending moment and the weight of the cap 505 creates a counter clockwise bending moment. The bending moment for the mass 515 is created because of the weight of the mass 515 and the distance between the mass 515 and the fulcrum. The bending moment for the cap 505 is created based on the weight of the cap 505 and the distance the center of mass of the cap 505 is from the fulcrum. When a user is filling the container 100 with a liquid, the liquid will be poured directly on to the cap 505. The flow of the water will cause the cap 505 to move downward and open the hole 525. More specifically, the flow of the water making contact with the cap 505 will create a bending moment that is great enough to cause rod 110 to rotate about the brackets 520. The bending moment that is generated is greater than the counteracting bending moment that is created by the mass 515. The flow of the water flows through the hole 525 and into the upper chamber 110 as depicted in FIG. 1 or the reservoir tank 210 as depicted in FIG. 2.

In further operation, the spout lid 530 covers the spout 160 of FIG. 1 when the container 100 is not in use. The spout lid 530 may be opened using the spout lid hinge 532, which includes a circular rod with a pin that runs through the circular rod. More specifically, when a user is pouring liquid that is stored in the lower chamber and channel of the container 100, the spout lid will open when the container is tipped toward the object in which the user is pouring in the liquid. This occurs because the circular rod will rotate around the pin causing the spout lid 530 to become open.

In some embodiments, the cap 505 is connected to the rod 510 using screws, latches, fasteners, or any other method of joining two or more parts. The mass 515 is connected to the rod 510 using similar methods. In other embodiments, the cap 505 and the rod 510 are a single entity.

In some embodiments, the lid 150 does not include the cap 505, the rod 510, the mass 515 or the hole 525. In this embodiment, the lid 150 is a cover that fits over the container 100 and is needed to be removed when a user wants to fill up the container 100 with liquid. The lid 150 would utilize the lip 534 to create an interference fit in the same manner as described above. In this embodiment, the user would introduce the liquid directly into the upper chamber 110 or the reservoir tank 210.

In some embodiments, the rod 510 can be connected to the bottom surface of the lid 150 using screws, latches, fasteners, brackets or a similar method of joining two or more parts to create a pivot.

In some embodiments, the spout lid hinge can be a bracket, a plate or any other method of creating a hinge.

In some embodiments, the lip 534 includes a plurality of lid connectors 535, which are created during the molding process. The plurality of lid connector 535 are the female part of a notch. The male counterpart notches are fabricated into the upper chamber 110 of FIG. 1. In operation, when the lid 150 is placed onto the upper chamber and pushed in, the male part located on the upper chamber will snap into the plurality of lid connectors 535 to secure the lid 150.

Figure 6:
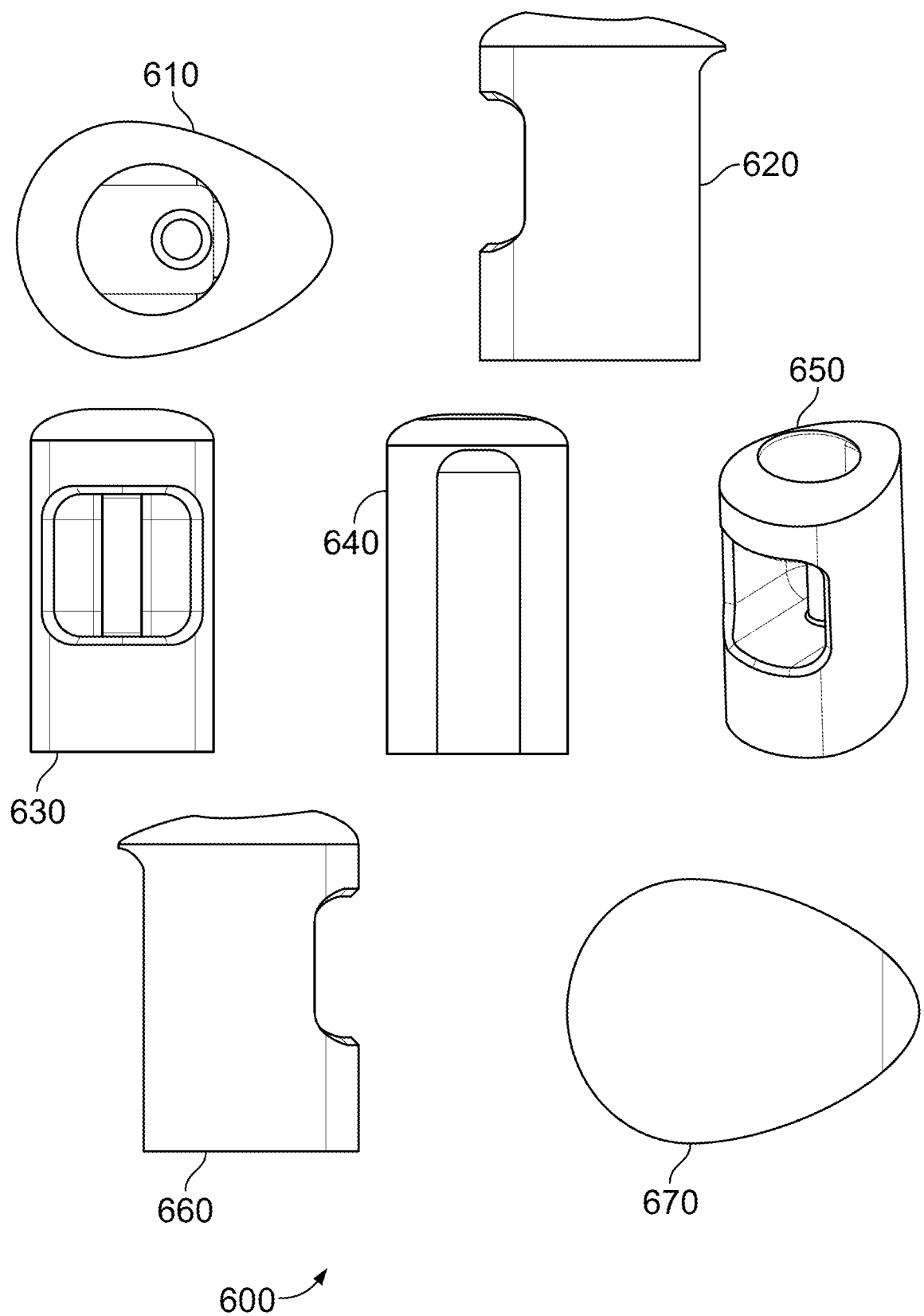
FIG. 6 schematically illustrates various perspective views of the container with a centralized handle of FIG. 1A, according to an example embodiment.

FIG. 6 illustrates various perspective views of the container 100. More specifically, FIG. 6 illustrates a top view 610, a right-side view 620, a back view 630, a front view 640, an isometric view 650, a left-side view 660, and a bottom view 670 of the container 100 as illustrated in FIG. 1A and FIG. 1B.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principles of the disclosure and its practical application to enable one skilled in the art to utilize the various implementations and with various modifications as are suited to the particular use contemplated. Other substitutions, modifications, changes and omissions may be made in the design, operating conditions and arrangement of the implementations without departing from the scope of the present disclosure as expressed in the appended claims.

What is claimed is:

1. A water filtration container comprising:
an upper chamber and a lower chamber coupled to the upper chamber via a hollow channel defined by at least one peripheral wall, the upper chamber and the lower chamber structured to store liquid;
a void defined by the at least one peripheral wall and located within an aperture located on the at least one peripheral wall;
a hollow handle connected to a lower portion of the upper chamber and an upper portion of the lower chamber, wherein the hollow handle lies within the void;
wherein the hollow handle is aligned with a vertical axis of the water filtration container and is adjacent to a center of mass of the water filtration container;
a reservoir tank coupled to the upper chamber wherein the reservoir tank comprises an elongated housing removably coupled to the hollow handle;
wherein the hollow handle is removable; and
a filter removably disposed within the elongated housing of the reservoir tank.

2. The container of claim 1, wherein the hollow handle is structured to fluidly connect the upper chamber and the lower chamber.

3. The container of claim 1, wherein the reservoir tank is structured to store excess liquid before flowing into the lower chamber, and wherein the reservoir tank is fluidly connected to the hollow handle.

4. The container of claim 1, wherein the elongated housing is cylindrical.

5. The container of claim 4, wherein a first length of the elongated housing is shorter than a second length of the hollow handle.

6. The container of claim 1, wherein the hollow handle passes through the center of mass of the container.

7. The container of claim 1, wherein the hollow handle is positioned such that a liquid introduced to the upper chamber flows through the hollow handle to the lower chamber.

8. The container of claim 1, wherein the filter is positioned within the hollow handle and is structured to release treated liquid to the lower chamber via an opening in the hollow handle.

9. The container of claim 1, wherein the filter is structured to receive untreated liquid from a source external to the hollow handle and treat the untreated liquid, whereby the untreated liquid is released as treated liquid into the lower chamber via an opening in the hollow handle.

10. The container of claim 1, wherein the filter comprises activated carbon.

* * * * *